(12) United States Patent
Nakashima et al.

(10) Patent No.: US 11,432,072 B2
(45) Date of Patent: Aug. 30, 2022

(54) SPEAKER DIAPHRAGM AND PRODUCTION METHOD THEREOF

(71) Applicant: Yamaha Corporation, Hamamatsu (JP)

(72) Inventors: Hiroshi Nakashima, Hamamatsu (JP); Tsunenori Sano, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 218 days.

(21) Appl. No.: 16/864,639

(22) Filed: May 1, 2020

(65) Prior Publication Data
US 2020/0260188 A1    Aug. 13, 2020

Related U.S. Application Data

(63) Continuation of application No. PCT/JP2018/039102, filed on Oct. 19, 2018.

(30) Foreign Application Priority Data

Nov. 2, 2017  (JP) .............................. JP2017-212964

(51) Int. Cl.
*H04R 7/12*      (2006.01)
*H04R 31/00*   (2006.01)
(Continued)

(52) U.S. Cl.
CPC ............. *H04R 7/125* (2013.01); *B32B 29/02* (2013.01); *H04R 31/003* (2013.01);
(Continued)

(58) Field of Classification Search
CPC .... H04R 7/125; H04R 9/06; H04R 2307/029; H04R 31/003; B32B 29/02; B32B 2260/021
See application file for complete search history.

(56) References Cited

U.S. PATENT DOCUMENTS

2003/0223613 A1   12/2003   Hachiya
2016/0234600 A1   8/2016    Kajihara et al.

FOREIGN PATENT DOCUMENTS

CN       203912169 U  * 10/2014
CN       203912169 U    10/2014
(Continued)

OTHER PUBLICATIONS

English translation of Chinese Office Action issued in Chinese Application No. 201880069482.2 dated Sep. 30, 2020 (nine (9) pages).
Chinese-language Office Action issued in Chinese Application No. 201880069482.2 dated Aug. 4, 2021 with English translation (17 pages).
(Continued)

*Primary Examiner* — Sunita Joshi
(74) *Attorney, Agent, or Firm* — Crowell & Moring LLP

(57) ABSTRACT

A speaker diaphragm includes a plurality of highly rigid layers and a porous layer. Each of the plurality of highly rigid layers includes a first resin matrix, and wood fibers and highly rigid fibers dispersed in the first resin matrix. The porous layer includes a second resin matrix comprising independent pores, and fibers comprising wood fibers and highly rigid fibers dispersed in the second resin matrix. Both outermost layers are the highly rigid layers. A percentage content of the wood fibers in the highly rigid layers is 10% by mass or more and 65% by mass or less. A percentage content of the highly rigid fibers in the highly rigid layers is 5% by mass or more and 40% by mass or less. A percentage content of total fibers in the porous layer is 15% by mass or more and 40% by mass or less.

19 Claims, 9 Drawing Sheets

(51) Int. Cl.
*H04R 9/06* (2006.01)
*B32B 29/02* (2006.01)

(52) U.S. Cl.
CPC ... *B32B 2260/021* (2013.01); *B32B 2260/046* (2013.01); *B32B 2262/106* (2013.01); *H04R 9/06* (2013.01); *H04R 2307/029* (2013.01)

(56) References Cited

FOREIGN PATENT DOCUMENTS

| EP | 3 059 976 A1 | | 8/2016 |
|----|----|----|----|
| JP | 2004-15194 A | | 1/2004 |
| JP | 2016-82442 A | | 5/2016 |
| JP | 2016082442 A | * | 5/2016 |
| WO | WO 2015/056419 A1 | | 4/2015 |

OTHER PUBLICATIONS

Extended European Search Report issued in European Application No. 18871983.5 dated Jul. 7, 2021 (nine (9) pages).

International Search Report (PCT/ISA/210) issued in PCT Application No. PCT/JP2018/039102 dated Nov. 27, 2018 with English translation (five pages).

Japanese-language Written Opinion (PCT/ISA/237) issued in PCT Application No. PCT/JP2018/039102 dated Nov. 27, 2018 (five pages).

Japanese-language Office Action issued in Japanese Application No. 2017-212964 dated Sep. 7, 2021 with English translation (nine (9) pages).

Chinese-language Office Action issued in Chinese Application No. 201880069482.2 dated Mar. 9, 2021 with English translation (20 pages).

* cited by examiner

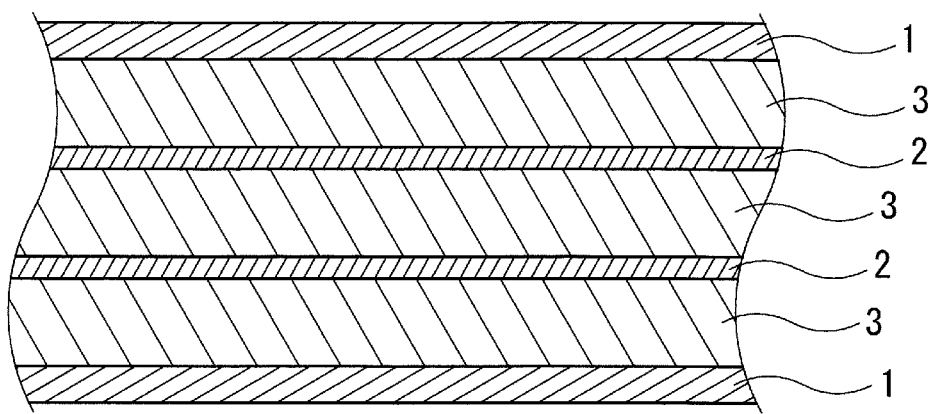
F I G. 1

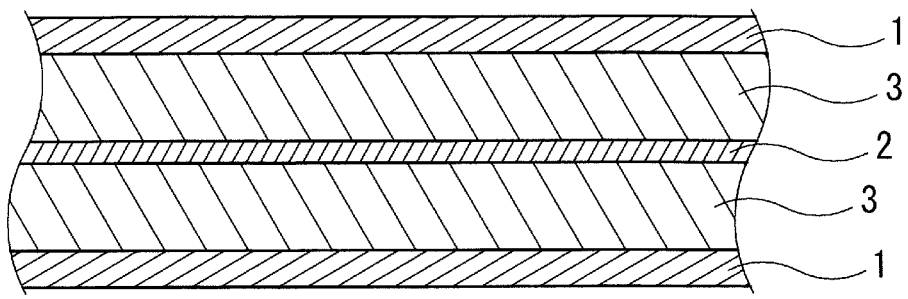
F I G. 3

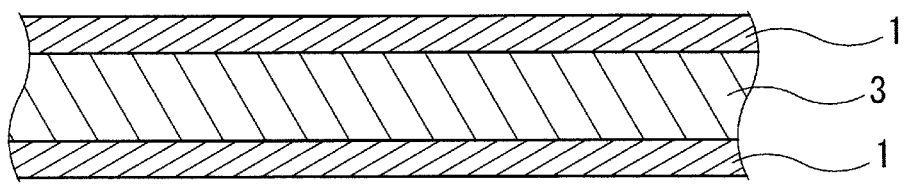
F I G. 4

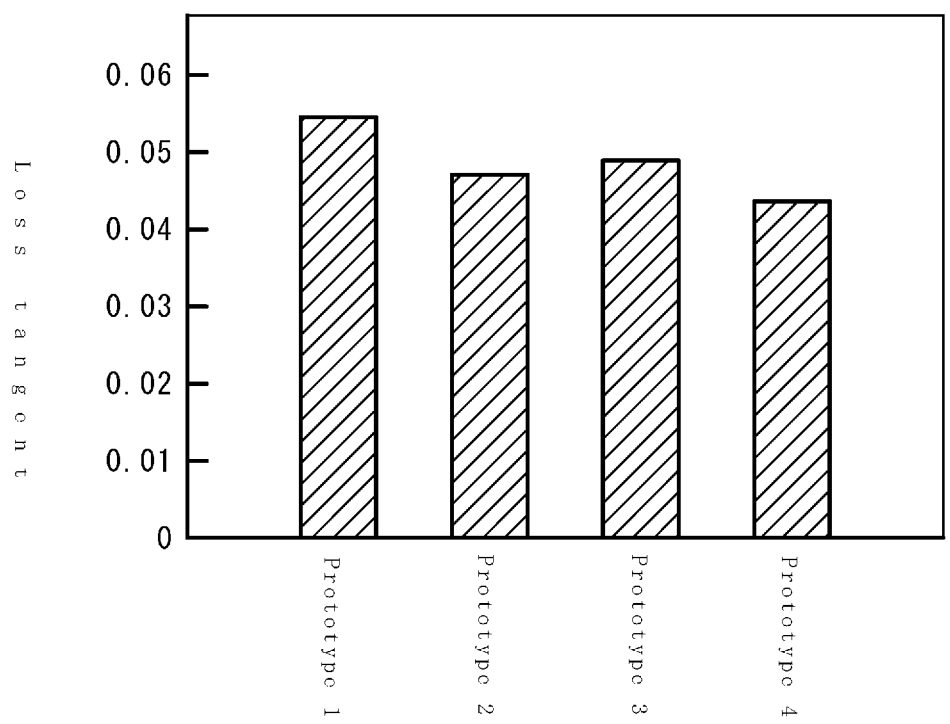
F I G. 6

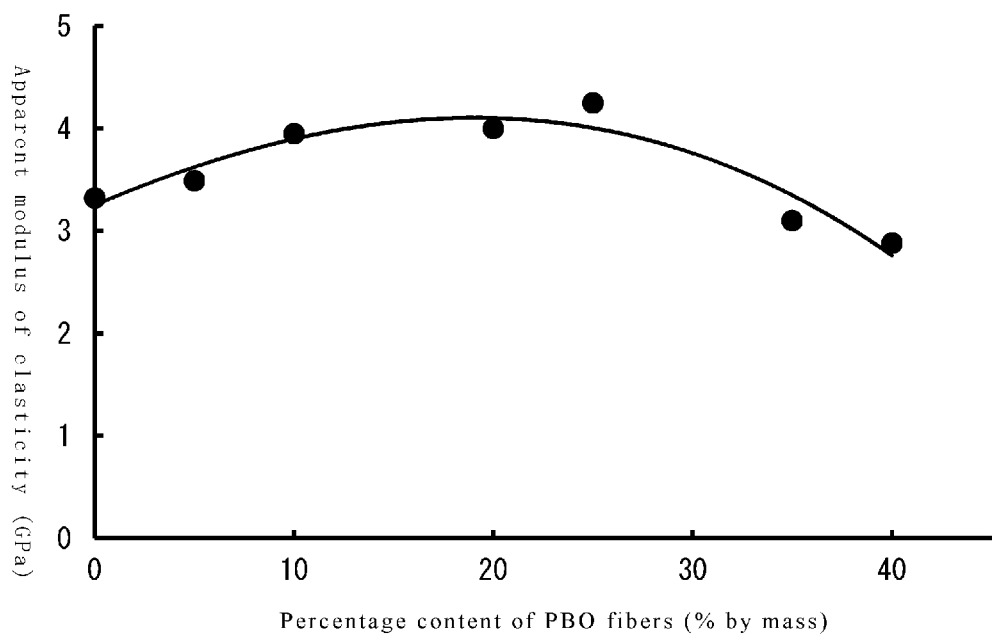
F I G. 8

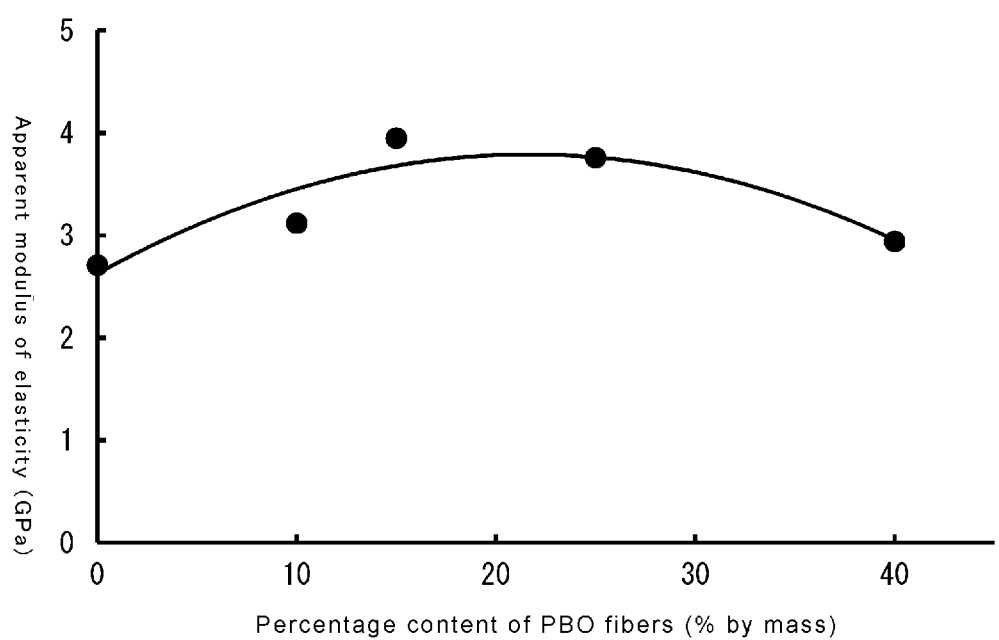
F I G. 9

SPEAKER DIAPHRAGM AND PRODUCTION METHOD THEREOF

CROSS-REFERENCE TO RELATED APPLICATIONS

This application is a continuation application of International Application No. PCT/JP2018/039102, filed on Oct. 19, 2018, which claims priority to Japanese Patent Application No. 2017-212964 filed in Japan on Nov. 2, 2017. The entire disclosures of International Application No. PCT/JP2018/039102 and Japanese Patent Application No. 2017-212964 are hereby incorporated herein by reference.

BACKGROUND

Technical Field

The present disclosure relates to a speaker diaphragm and a production method thereof.

Background Information

It is desirable for a speaker diaphragm (may be also referred to as "speaker vibration plate") to have high rigidity while being light in weight in order to efficiently emit sound. Further, it is preferable for the speaker diaphragm to have a high vibration attenuation rate (internal loss) in order to improve sound reproducibility. For the speaker diaphragm satisfying such conditions, a material in which wood fibers are subjected to sheet-forming ("cone paper," as generally referred to) is widely used.

In the case of making the speaker diaphragm by subjecting the wood fibers to sheet-forming, since adjusting density of fibers is relatively easy, the rigidity of the speaker diaphragm obtained through this adjustment of the density can be controlled. Further, a sheet-formed product of the wood fibers has gaps in interiors, and these gaps increase internal loss, thereby increasing the vibration attenuation rate.

The speaker diaphragm constituted from the sheet-formed product of the wood fibers has a disadvantage of being weak to wetting. Accordingly, attempts have been made to impregnate the sheet-formed product of the wood fibers with a resin; however, adjusting density is difficult, and localization of the resin results in a problem of vibration characteristics becoming impaired. To address this problem, some have proposed a speaker diaphragm which can be formed to be even with the density being easily adjusted by alternately laminating: a solid layer including wood fibers and a thermoplastic resin; and a porous layer including wood fibers and a thermoplastic resin.

Thus, since weight is likely to increase when the resin is used in the speaker diaphragm, further increasing the rigidity is desirable. In the above document, it is described that a reinforcing fiber may be blended in to improve the rigidity. However, in the case of blending in the reinforcing fiber, if the blending is not appropriately conducted, a problem of the rigidity decreasing may rather occur.

SUMMARY

In view of the aforementioned circumstances, an object of the present disclosure is to provide a speaker diaphragm having high rigidity and a sufficient vibration attenuation rate.

According to one aspect of the present disclosure made for solving the aforementioned problems, a speaker diaphragm has a plurality of highly rigid layers each having a resin matrix, and wood fibers and highly rigid fibers dispersed in the resin matrix; and a porous layer having a resin matrix containing independent pores, and fibers including wood fibers and highly rigid fibers dispersed in the resin matrix, wherein both of outermost layers are the highly rigid layers, a percentage content of the wood fibers in the highly rigid layers is 10% by mass or more and 65% by mass or less, a percentage content of the highly rigid fibers in the highly rigid layers is 5% by mass or more and 40% by mass or less, and a percentage content of total fibers in the porous layer is 15% by mass or more and 40% by mass or less.

According to another aspect of the present disclosure made for solving the aforementioned problems, a production method of a speaker diaphragm is a method of producing a speaker diaphragm which has a plurality of highly rigid layers each having a resin matrix, and wood fibers and highly rigid fibers dispersed in the resin matrix; and a porous layer having a resin matrix having fibers including wood fibers and highly rigid fibers dispersed in the resin matrix, wherein the highly rigid layers are arranged as both of outermost layers, a percentage content of the wood fibers in the highly rigid layers is 10% by mass or more and 65% by mass or less, a percentage content of the highly rigid fibers in the highly rigid layers is 5% by mass or more and 40% by mass or less, and a percentage content of total fibers in the porous layer is 15% by mass or more and 40% by mass or less, the production method including: subjecting materials for forming the highly rigid layers and the porous layer to wet sheet-forming to form layer shapes; drying material layers obtained by the wet sheet-forming; and hot pressing the material layers following the drying. Other objects, advantages and novel features of the different aspects of the present disclosure will become apparent from the following detailed description of one or more preferred embodiments, when considered in conjunction with the accompanying drawings, in which:

BRIEF DESCRIPTION OF THE DRAWINGS

FIG. 1 is a schematic partial cross-sectional view illustrating a configuration of a speaker diaphragm;

FIG. 3 is a schematic partial cross-sectional view illustrating a configuration of a speaker diaphragm;

FIG. 4 is a schematic partial cross-sectional view illustrating a configuration of a speaker diaphragm;

FIG. 6 is a graph illustrating loss tangents of trial products of speaker diaphragms having differing types of fibers;

FIG. 8 is a graph illustrating apparent moduli of elasticity of trial products of speaker diaphragms having a fixed percentage content of polyethylene short fibers and differing percentage contents of highly rigid fibers; and FIG. 9 is a graph illustrating apparent moduli of elasticity of trial products of speaker diaphragms having a fixed ratio of each percentage content of polyethylene short fibers to wood fibers, and differing percentage contents of highly rigid fibers.

DESCRIPTION OF EMBODIMENTS

Figure 2:
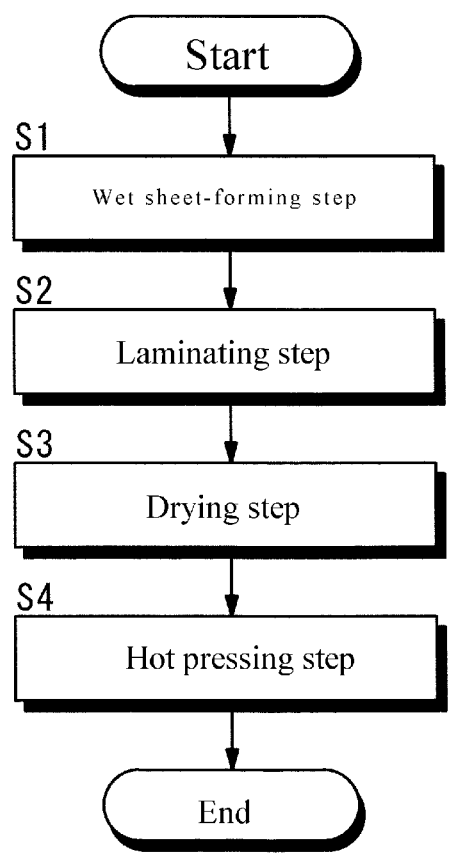
FIG. 2 is a flow chart illustrating a production method of the speaker diaphragm.

Hereinafter, embodiments of the present disclosure will be described in detail with reference to a drawing or drawings as appropriate.

The speaker diaphragm according to one aspect of the present disclosure has a plurality of highly rigid layers each having a resin matrix and fibers dispersed in the resin matrix, wherein the fibers in the highly rigid layers include wood fibers and highly rigid fibers.

By virtue of having the highly rigid layers, which are comparatively rigid due to being reinforced by the highly rigid fibers and has an improved vibration attenuation rate due to including the wood fibers, providing the speaker diaphragm in which the vibration attenuation rate is sufficient and the rigidity is comparatively high is enabled. Moreover, due to having the configuration in which the wood fibers and the highly rigid fibers are dispersed in the resin matrix, the speaker diaphragm can vibrate as a whole despite including the wood fibers and the highly rigid fibers, which have differing physical properties.

The speaker diaphragm preferably further includes a porous layer which is laminated to the highly rigid layers and which has a resin matrix and fibers dispersed in the resin matrix. By thus further including the porous layer, which is laminated to the highly rigid layers and which has the resin matrix and the fibers dispersed in the resin matrix, the vibration attenuation rate of the porous layer is comparatively high; accordingly, providing the speaker diaphragm in which, as a whole, the rigidity is high and the vibration attenuation rate is sufficiently high is enabled.

In the speaker diaphragm, it is preferable that the highly rigid layers and the porous layer are alternately laminated, and that both of outermost layers of the speaker diaphragm are the highly rigid layers. By thus having the highly rigid layers and the porous layer be alternately laminated, the rigidity and the vibration attenuation rate of the speaker diaphragm can be easily optimized. Moreover, by having the outermost layers be the highly rigid layers, a rigidity-enhancing effect due to the highly rigid layers can be increased.

It is preferable that the speaker diaphragm has at least one of the highly rigid layers in addition to the outermost layers, a thickness of the at least one of the highly rigid layers other than the outermost layers being less than a thickness of the highly rigid layers as the outermost layers. By having the thickness of the at least one of the highly rigid layers other than the outermost layers be less than the thickness of the highly rigid layers as the outermost layers, internal loss is enhanced due to the rigidity of the speaker diaphragm being lower, thereby enabling the vibration attenuation rate to be increased.

It is preferable that the speaker diaphragm further includes a semi-rigid layer which is laminated to the porous layer and in which a content of the highly rigid fibers is less than that in the highly rigid layers. By thus further including the semi-rigid layer which is laminated to the porous layer and in which a content of the highly rigid fibers is less than that in the highly rigid layers, the rigidity and the vibration attenuation rate of the speaker diaphragm can be more easily optimized.

In the speaker diaphragm, it is preferable that the resin matrix of the highly rigid layers is a thermoplastic resin. By thus having the resin matrix of the highly rigid layers be a thermoplastic resin, comparatively easy forming of the speaker diaphragm is enabled.

In the speaker diaphragm, it is preferable that a percentage content of the resin matrix in the highly rigid layers is 20% by mass or more and 80% by mass or less. By thus having the percentage content of the resin matrix in the highly rigid layers fall within the above range, the wood fibers and the highly rigid fibers can be unified, and the rigidity and the vibration attenuation rate of the highly rigid layers can be increased.

In the speaker diaphragm, it is preferable that the highly rigid fibers are polyparaphenylenebenzobisoxazole fibers. By thus having the highly rigid fibers be polyparaphenylenebenzobisoxazole fibers, the rigidity of the speaker diaphragm can be further increased.

In the speaker diaphragm, it is preferable that a percentage content of the highly rigid fibers in the highly rigid layers is 5% by mass or more and 40% by mass or less. By thus having the percentage content of the highly rigid fibers in the highly rigid layers fall within the above range, a reduction of the vibration attenuation rate can be more certainly inhibited, and the rigidity can be more effectively improved.

An average length of the highly rigid fibers is preferably 6 mm or less. By thus having the average length of the highly rigid fibers be equal to or less than the upper limit, mixing with pulp and formation of the highly rigid layers wherein the highly rigid layers are even are comparatively easy.

As described above, the speaker diaphragm according to the one aspect of the present disclosure has the rigidity and the vibration attenuation rate both being high.

A production method of the speaker diaphragm according to the other aspect of the present disclosure is a method of producing a speaker diaphragm which has a plurality of highly rigid layers each having a resin matrix, and wood fibers and highly rigid fibers dispersed in the resin matrix; and a porous layer having a resin matrix having fibers including wood fibers and highly rigid fibers dispersed in the resin matrix, wherein the highly rigid layers are arranged as both of outermost layers, a percentage content of the wood fibers in the highly rigid layers is 10% by mass or more and 65% by mass or less, a percentage content of the highly rigid fibers in the highly rigid layers is 5% by mass or more and 40% by mass or less, and a percentage content of total fibers in the porous layer is 15% by mass or more and 40% by mass or less, the production method including subjecting materials for forming the highly rigid layers and the porous layer to wet sheet-forming to form layer shapes; drying material layers obtained by the wet sheet-forming; and hot pressing the material layers following the drying.

Due to including the wet sheet-forming, the drying, and the hot pressing, the production method of the speaker diaphragm enables easy production of the speaker diaphragm in which the rigidity is high and the vibration attenuation rate is sufficient.

Speaker Diaphragm

FIG. 1 illustrates a layer structure of the speaker diaphragm according to an embodiment of the present invention. The speaker diaphragm is formed into a shape, such as a cone shape or the like, in accordance with a speaker to be used. It is to be noted that the speaker with which the speaker diaphragm is to be used may be, for example, a small speaker for use in headphones, earphones, portable electronic devices, or the like. Accordingly, a size of the speaker diaphragm is also appropriately selected in accordance with the speaker to be used.

The speaker diaphragm has a seven-layer structure including a pair of highly rigid layers 1; two semi-rigid layers 2; and three porous layers 3, which are alternately laminated with the highly rigid layers 1 or the semi-rigid layers 2. In other words, in the speaker diaphragm, one layer of either the highly rigid layers 1 or the semi-rigid layers 2 exists between adjacent layers of the porous layers 3. In addition, the highly rigid layers 1 are provided on both sides of outermost layers of the speaker diaphragm.

Highly Rigid Layers

Each of the pair of the highly rigid layers 1 has a resin matrix and fibers dispersed in the resin matrix.

The highly rigid layers 1 improve the rigidity of the speaker diaphragm, and also impart water resistance.

The lower limit of an average thickness of the highly rigid layers 1 may vary depending on the size of the speaker diaphragm, and is preferably 10 μm, and more preferably 20 μm. The upper limit of the average thickness of the highly rigid layers 1 is preferably 500 μm, and more preferably 200 μm. In a case in which the average thickness of the highly rigid layers 1 is less than the lower limit, it may not be possible to sufficiently improve the water resistance and the rigidity of the speaker diaphragm. Conversely, in a case in which the average thickness of the highly rigid layers 1 is greater than the upper limit, performance may decrease due to the speaker diaphragm increasing in weight.

The lower limit of a porosity of the highly rigid layers 1 is preferably 1%, and more preferably 2%. The upper limit of the porosity of the highly rigid layers 1 is preferably 20%, more preferably 15%, and still more preferably 10%. In a case in which the porosity of the highly rigid layers 1 is less than the lower limit, forming the highly rigid layers 1 may become difficult. Conversely, in a case in which the porosity of the highly rigid layers 1 is greater than the upper limit, it may not be possible to sufficiently improve the water resistance and the rigidity of the speaker diaphragm. It is to be noted that "porosity" as referred to herein means a value calculated as an area percentage occupied by pores in a cross section.

Resin Matrix

The resin matrix of the highly rigid layers 1 is acceptable as long as it enables dispersing the fibers for formation into a desired shape, and thermoplastic resin, which can be formed by hot pressing, can be suitably used. Examples of the thermoplastic resin which can be used include polyolefins such as polyethylene and polypropylene. Moreover, in light of formability by the hot pressing, the thermoplastic resin having a melting point of 100° C. or more and 180° C. or less is preferably used.

It is preferable for the resin matrix to be formed by fusing together a plurality of thermoplastic resin fibers. As such thermoplastic resin fibers, thermoplastic resin fibers commercially available as chemical pulp (SWP; Synthetic Wood Pulp) can be suitably used. It is to be noted that the thermoplastic resin fibers are melted to become the resin matrix by heating and compression, as described later; accordingly, the thermoplastic resin fibers do not exist as fibers in the speaker diaphragm.

The lower limit of a percentage content of the resin matrix in the highly rigid layers 1 is preferably 20% by mass, more preferably 40% by mass, and still more preferably 50% by mass. The upper limit of the percentage content of the resin matrix in the highly rigid layers 1 is preferably 80% by mass, more preferably 70% by mass, and still more preferably 60% by mass. In a case in which the percentage content of the resin matrix in the highly rigid layers 1 is less than the lower limit, strength of the speaker diaphragm may be insufficient and/or vibration of the speaker diaphragm as a whole may not be possible due to an inability to sufficiently connect the fibers together. Conversely, in a case in which the percentage content of the resin matrix is greater than the upper limit, the rigidity of the highly rigid layers 1 and in turn the speaker diaphragm may be insufficient.

Fibers

The fibers in the highly rigid layers 1 include the wood fibers and the highly rigid fibers.

Highly Rigid Fibers

The highly rigid fibers increase the rigidity of the highly rigid layers 1 and in turn the speaker diaphragm, but compared to the rigidity-enhancing effect, the reduction of the vibration attenuation rate is small.

The highly rigid fibers may be exemplified by polyparaphenylenebenzobisoxazole fibers, polyparaphenyleneterephthalamide fibers, carbon fibers, and the like, and of these, the polyparaphenylenebenzobisoxazole fibers, which have high rigidity, can be particularly suitably used.

The lower limit of an average length of the highly rigid fibers is preferably 0.1 mm, and more preferably 0.5 mm. The upper limit of the average length of the highly rigid fibers is preferably 6 mm, and more preferably 4 mm. In a case in which the average length of the highly rigid fibers is less than the lower limit, it may be difficult to form the highly rigid layers 1 by the sheet-forming. Conversely, in a case in which the average length of the highly rigid fibers is greater than the upper limit, the highly rigid fibers may become tangled together and form a clump, and it may not be possible to homogenously disperse the highly rigid fibers with the wood fibers.

The lower limit of an average diameter of the highly rigid fibers is preferably 5 μm, and more preferably 10 μm. The upper limit of the average diameter of the highly rigid fibers is preferably 100 μm, and more preferably 50 μm. In a case in which the average diameter of the highly rigid fibers is less than the lower limit or greater than the upper limit, it may become difficult to homogenously disperse the highly rigid fibers together with the wood fibers.

The lower limit of a percentage content of the highly rigid fibers in the highly rigid layers 1 is preferably 5% by mass, and more preferably 10% by mass. The upper limit of a percentage content of the highly rigid fibers in the highly rigid layers 1 is preferably 40% by mass, and more preferably 30% by mass. In a case in which the percentage content of the highly rigid fibers in the highly rigid layers 1 is less than the lower limit, it may not be possible to sufficiently improve the rigidity of the highly rigid layers 1 and in turn the speaker diaphragm. Conversely, in a case in which the percentage content of the highly rigid fibers in the highly rigid layers 1 is greater than the upper limit, the vibration attenuation rate of the highly rigid layers 1 and in turn the speaker diaphragm may be insufficient. Further, by having the percentage content of the highly rigid fibers in the highly rigid layers 1 be 18% by mass or less, and preferably 15% by mass or less, unevenness in the rigidity and the vibration attenuation rate of the highly rigid layers 1 can be reduced, enabling consistency in quality of the speaker diaphragm.

Wood Fibers

The wood fibers reduce mass of the highly rigid layers 1 while increasing the rigidity. The rigidity-enhancing effect of the wood fibers is less than the rigidity-enhancing effect of the highly rigid fibers, but is able to improve the vibration attenuation rate. Accordingly, through combined use of the wood fibers and the highly rigid fibers, it is possible to improve the performance of the highly rigid layers 1 and in turn the speaker diaphragm.

The wood fibers included in the highly rigid layers 1 may be appropriately selected and used as one type, or two or more types of, for example: chemical pulps such as leaf bleached kraft pulp (LBKP), needle bleached kraft pulp (NBKP), leaf unbleached kraft pulp (LUKP), leaf semi-bleached kraft pulp (LSBKP), hardwood sulfite pulp, and softwood sulfite pulp; mechanical pulps such as stone-ground pulp (SGP), pressurized stone-ground pulp (PGW), refiner ground pulp (RGP), thermomechanical pulp (TMP), chemi-ground pulp (CGP), and groundwood pulp (GP); disintegrated wastepaper pulp produced from various kinds of wastepaper and the like; disintegrated and deinked waste paper pulp; disintegrated, deinked, and bleached waste paper pulp; and the like.

The lower limit of a percentage content of the wood fibers in the highly rigid layers 1 is preferably 10% by mass, and more preferably 15% by mass. The upper limit of the percentage content of the wood fibers in the highly rigid layers 1 is preferably 65% by mass, and more preferably 45% by mass. In a case in which the percentage content of the wood fibers in the highly rigid layers 1 is less than the lower limit, the vibration attenuation rate of the highly rigid layers 1 and in turn the speaker diaphragm may be insufficient. Conversely, in a case in which the percentage content of the wood fibers in the highly rigid layers 1 is greater than the upper limit, the rigidity of the highly rigid layers 1 and in turn the speaker diaphragm may be insufficient due to an amount of the highly rigid fibers becoming relatively lower.

Semi-Rigid Layers

A plurality of the semi-rigid layers 2 each have a resin matrix and fibers dispersed in the resin matrix.

The semi-rigid layers 2 improve the rigidity of the speaker diaphragm.

The lower limit of an average thickness of the semi-rigid layers 2 may vary depending on the size of the speaker diaphragm, and is preferably 5 µm, and more preferably 3 µm. The upper limit of the average thickness of the semi-rigid layers 2 is preferably 200 µm, and more preferably 100 µm. In a case in which an average thickness of the semi-rigid layers 2 is less than the lower limit, the rigidity of the semi-rigid layers 2 and in turn the speaker diaphragm may be insufficient. Conversely, in a case in which the average thickness of the semi-rigid layers 2 is greater than the upper limit, the performance of the speaker diaphragm may decrease due to the speaker diaphragm increasing in weight.

The lower limit of a porosity of the semi-rigid layers 2 is preferably 1%, and more preferably 2%. The upper limit of the porosity of the semi-rigid layers 2 is preferably 20%, more preferably 15%, and still more preferably 10%. In a case in which the porosity of the semi-rigid layers 2 is less than the lower limit, forming the semi-rigid layers 2 may become difficult. Conversely, in a case in which the porosity of the semi-rigid layers 2 is greater than the upper limit, it may not be possible to sufficiently improve the rigidity of the speaker diaphragm.

Resin Matrix

As the resin matrix of the semi-rigid layers 2, a resin matrix similar to that of the highly rigid layers 1 may be used.

Fibers

In terms of fibers in the semi-rigid layers 2, a content of the highly rigid fibers is less than that in the highly rigid layers 1, and the semi-rigid layers 2 may not include any highly rigid fibers at all. Further, it is preferable for the semi-rigid layers 2 to include the wood fibers as the main component of the fibers. More specifically, a percentage of the wood fibers with respect to total fibers in the semi-rigid layers 2 is preferably 50% by mass or more.

The lower limit of a percentage content of the total fibers in the semi-rigid layers 2 is preferably 20% by mass, and more preferably 25% by mass. The upper limit of the percentage content of the total fibers in the semi-rigid layers 2 is preferably 50% by mass, and more preferably 45% by mass. In a case in which the percentage content of the total fibers in the semi-rigid layers 2 is less than the lower limit, the rigidity of the semi-rigid layers 2 and in turn the speaker diaphragm may be insufficient. Conversely, in a case in which the percentage content of the total fibers in the semi-rigid layers 2 is greater than the upper limit, it may become difficult to fill spaces between the fibers with the resin and sufficiently reduce the porosity.

Highly Rigid Fibers

In the case of including the highly rigid fibers in the semi-rigid layers 2, the highly rigid fibers included in the semi-rigid layers 2 may be similar to the highly rigid fibers in the highly rigid layers 1.

Wood Fibers

The wood fibers included in the semi-rigid layers 2 may be similar to the wood fibers in the highly rigid layers 1.

Porous Layers

The porous layers 3 have a large number of pores, and have a resin matrix and fibers dispersed in the resin matrix.

The porous layers 3 convert vibration energy into heat, thereby attenuating the vibration, by concentrating pressure during the vibration due to the presence of the pores.

The lower limit of an average thickness of the porous layers 3 may vary depending on the size of the speaker diaphragm, and is preferably 50 µm, and more preferably 100 µm. The upper limit of the average thickness of the porous layers 3 is preferably 500 µm, and more preferably 400 µm. In a case in which the average thickness of the porous layers 3 is less than the lower limit, the vibration attenuation rate of the porous layers 3 may be insufficient. Conversely, in a case in which the average thickness of the porous layers 3 is greater than the upper limit, sound may be distorted due to integration with the highly rigid layers 1 and the semi-rigid layers 2 being lost.

Resin Matrix

As the resin matrix of the porous layers 3, a resin matrix similar to that of the resin matrix of the highly rigid layers 1 may be used.

Fibers

It is preferable for the highly rigid fibers or the wood fibers to be the main component of the fibers in the porous layers 3.

The lower limit of a percentage content of the total fibers in the porous layers 3 is preferably 15% by mass, and more preferably 20% by mass. The upper limit of the percentage content of the total fibers in the porous layers 3 is preferably 40% by mass, and more preferably 35% by mass. In a case in which the percentage content of the total fibers in the porous layers 3 is less than the lower limit, the rigidity of the porous layers 3 and in turn the speaker diaphragm may be insufficient. Conversely, in a case in which the percentage content of the total fibers in the porous layers 3 is greater than the upper limit, the porous layers 3 may become liable to tear.

The pores of the porous layers 3 are preferably made as independent pores so as to enable a reduction of the rigidity of the porous layers 3 to be inhibited. Such pores can be formed by using, for example, hollow microbeads, thermally expandable microcapsules, or the like.

The lower limit of an average diameter of the pores of the porous layers 3 is preferably 20 μm, and more preferably 30 μm. The upper limit of the average diameter of the pores of the porous layers 3 is preferably 100 μm, and more preferably 80 μm. In a case in which the average diameter of the pores of the porous layers 3 is less than the lower limit, it may become difficult to form the pores evenly. Conversely, in a case in which the average diameter of the pores of the porous layers 3 is greater than the upper limit, the reduction of the rigidity of the porous layers 3 may become excessive.

The lower limit of a porosity of the porous layers 3 is preferably 30%, and more preferably 40%. The lower limit of the porosity of the porous layers 3 is preferably 80%, and more preferably 70%. In a case in which the porosity of the porous layers 3 is less than the lower limit, it may not be possible to sufficiently improve the vibration attenuation rate of the porous layers 3. Conversely, in a case in which the porosity of the porous layers 3 is greater than the upper limit, the rigidity of the porous layers 3 and in turn the speaker diaphragm may be insufficient.

Highly Rigid Fibers

The highly rigid fibers included in the porous layers 3 may be similar to the highly rigid fibers in the highly rigid layers 1.

Wood Fibers

The wood fibers included in the porous layers 3 may be similar to the wood fibers in the highly rigid layers 1.

Advantages

By having the highly rigid layers 1 and the semi-rigid layers 2, which are both comparatively rigid due to being reinforced by the fibers, alternately laminated to the porous layers 3, for which the vibration attenuation rate is comparatively high due to having the pores, the speaker diaphragm takes on a state in which layers which have different moduli of elasticity are alternately laminated to each other; accordingly, the internal loss is able to be enhanced due to shearing strains being concentrated in the porous layers 3. Moreover, the speaker diaphragm enables easy optimization of, respectively, improvement of the rigidity due to the highly rigid layers 1 and the semi-rigid layers 2; and improvement of the vibration attenuation rate due to the porous layers 3. Further, the speaker diaphragm is highly resistant to wetting due to having both sides of the outermost layers in a thickness direction be the highly rigid layers 1.

In addition, due to the fibers in the highly rigid layers 1 including the highly rigid fibers, the speaker diaphragm enables inhibiting the reduction of the vibration attenuation rate while increasing the rigidity. Accordingly, in the speaker diaphragm, both the rigidity and the vibration attenuation rate are high.

Production Method

As illustrated in FIG. 2, the speaker diaphragm can be easily produced by a method including: subjecting formation materials for forming the highly rigid layers 1, the semi-rigid layers 2, and the porous layers 3 to wet sheet-forming to form layer shapes (step S1: wet sheet-forming step); laminating the material layers (step S2: laminating step); drying a laminate of the material layers (step S3: drying step); and hot pressing the laminate of the material layers thus dried (step S4: hot pressing step).

Wet Sheet-Forming Step

In step S1, the wet sheet-forming step, by conducting wet sheet-forming using a slurry in which the formation materials for the highly rigid layers 1, the semi-rigid layers 2, and the porous layers 3 have been dispersed in a dispersion medium; and a sheet-forming mold having a shape that corresponds to the speaker diaphragm, each of the layers is formed with the formation materials for each of the layers.

In order to enable such sheet-forming, as materials constituting the resin matrix of each of the layers, it is preferable to use, for example, synthetic pulp or the like, formed into fibers or fine particles.

As the dispersion medium of the slurry, for example, an aqueous dispersion medium such as water, an aqueous methanol solution, or an aqueous ethanol solution may be used. Further, a percentage content of solid content in the slurry can be, for example, 0.1% by mass or more and 10% by mass or less.

In addition, to form the pores, the formation materials for the porous layers 3 preferably contain, for example, a chemical foaming agent, thermally expandable microcapsules, hollow beads, and/or the like. Of these, in light of enabling certain formation of foam, the formation materials for the porous layers 3 preferably include thermally expandable microcapsules obtained by encapsulating a low melting-point solvent in expandable outer shells.

As a material for the outer shells of the thermally expandable microcapsules, for example, a thermoplastic resin constituted from a copolymer of vinylidene chloride, acrylonitrile, an acrylic acid ester, a methacrylic acid ester, and/or the like may be used. In addition, as the low melting-point solvent encapsulated in the outer shells of the thermally expandable microcapsules, for example, volatile organic solvents such as pentane, petroleum ether, hexane, low-melting-point halogenated hydrocarbon, and tetramethylsilane may be used.

An average diameter of the thermally expandable microcapsules before expanding can be, for example, 5 μm or more and 20 μm or less. Further, an expansion temperature of the thermally expandable microcapsules can be, for example, 80° C. or more and 220° C. or less.

In addition, the sheet-forming mold for use in subjecting the formation materials for each of the layers to sheet-forming in the wet sheet-forming step is acceptable as long as it has a shape corresponding to the desired speaker diaphragm, captures the formation materials for each of the layers, and allows the dispersion medium to permeate. In terms of specific examples of the sheet-forming mold, a metal mesh or a perforated metal can be used.

The sheet-forming of the formation materials for the highly rigid layers 1, the semi-rigid layers 2, and the porous layers 3 can be performed sequentially using the same sheet-forming mold.

Laminating Step

In step S2, the laminating step, sheet-formed products of the formation materials for the highly rigid layers 1, the semi-rigid layers 2, and the porous layers 3 are laminated in order.

In the laminating, sheet-formed products are preferably stacked in order and discharged from the sheet-forming mold used in step S1, the wet sheet-forming step. In a case of performing step S1, the wet sheet-forming step, using a single sheet-forming mold; step S1, the wet sheet-forming step, and step S2, the laminating step, are preferably repeated for each of the layers.

Drying Step

In step S3, the drying step, the solvent remaining in the sheet-formed products thus laminated is volatilized. A procedure for drying the sheet-formed products thus laminated is not particularly limited, and a procedure using an oven can be used. A temperature of the drying using an oven can be, for example, 60° C. or more and 90° C. or less. A time period of the drying can be, for example, 5 min or more and 3 hrs or less. It is to be noted that the drying step may be conducted before step S2, the laminating step. More specifically, the sheet-formed products of the formation materials for each of the layers may be separately dried, and then laminated and provided for the hot pressing step, which follows.

Hot Pressing Step

In step S4, the hot-pressing step, by placing the laminate thus dried in a pair of press molds having a copying model of the desired speaker diaphragm and then heating and compressing, a continuous resin matrix is formed by melting the materials for forming the resin matrixes of each of the layers, and the highly rigid layers 1, the semi-rigid layers 2, and the porous layers 3 are bonded together by the resin matrix.

Further, in the case in which the formation materials for the porous layers 3 include, for example, the foaming agent, the thermally expandable microcapsules, or the like; the hot pressing causes forming or expanding, thereby forming pores in the porous layers 3.

To obtain a desired thickness for the porous layers 3 and in turn the speaker diaphragm, a space is preferably provided between the pair of press molds during the hot pressing by, for example, placing spacer(s) between the pair of press molds, or the like.

A heating temperature in the hot pressing step is at least a melting point of the resin matrixes, and can be, for example, a temperature exceeding the melting point of the resin matrixes by 5° C. or more and 20° C. or less.

A heating time period in the hot pressing step can be, for example, 10 sec or more and 60 sec or less.

Further, after the heating, it is preferable to cool the press molds in a state of compression and harden the resin matrixes before removing the speaker diaphragm from the pair of press molds.

OTHER EMBODIMENTS

The embodiments described above do not restrict the constituent features of the present disclosure. Therefore, constituent elements of each part of the above-described embodiments may be omitted, replaced, or added based on the description in the present specification and common technical knowledge, and such omission, replacement, and addition should be construed as falling within the scope of the present disclosure.

The speaker diaphragm may have a configuration in which only one of the outermost layers is a highly rigid layer, which includes the highly rigid fibers. Further, the speaker diaphragm may have at least one layer other than the outermost layers (inner layer(s)) as at least one of the highly rigid layers, which includes the highly rigid fibers. In this case, a thickness of the at least one of the highly rigid layers as the inner layer(s) is preferably less than a thickness of the highly rigid layer(s) as the at least one of the outermost layers. By having the at least one of the highly rigid layers as the inner layer(s) be thinner than the highly rigid layer(s) as the at least one of the outermost layers, internal loss can be enhanced due to the rigidity being lower. In other words, at least one highly rigid layer being thinner than the highly rigid layer(s) as the at least one of the outermost layers may be provided in place of the semi-rigid layer. The at least one highly rigid layer as the inner layer may be formed as a thin, wavy layer in a cross-sectional structure of the speaker diaphragm. Making the at least one highly rigid layer wavy enables lowering of the rigidity as compared to a flat layer, thereby enabling enhancement of the internal loss.

In the speaker diaphragm, numbers of the semi-rigid layer and the porous layer may be arbitrarily decided. Accordingly, the speaker diaphragm may consist of only the highly rigid layer(s), and may consist of one or two layers of the highly rigid layer and one layer of the porous layer. Examples in which a pair of outermost surfaces are the highly rigid layers, in addition to the above-described seven-layer structure, may include a five-layer structure and a three-layer structure. As illustrated in FIG. 3, the speaker diaphragm with the five-layer structure has a pair of the highly rigid layers 1, one semi-rigid layer 2, and two porous layers 3, and the porous layers 3 are alternately laminated with the highly rigid layers 1 or the semi-rigid layer 2. The semi-rigid layer 2 in the five-layer structure may be replaced by a highly rigid layer which is thinner than the highly rigid layer 1 as the outermost surfaces. Even with the five-layer structure, effects similar to those of the speaker diaphragm with the seven-layer structure can be obtained. As illustrated in FIG. 4, the speaker diaphragm with the three-layer structure has a pair of the highly rigid layers 1 and one layer of the porous layer 3 interposed between the pair of the highly rigid layers 1. In the case of the three-layer structure, because there are fewer layers compared to the seven-layer structure and the five-layer structure, the overall rigidity is lower; accordingly, the rigidity can be increased by interposing the porous layer 3 between the pair of the highly rigid layers 1. Further, the highly rigid layers, which are stiff, being joined to the porous layer concentrates stress on the porous layer, making shearing strains more likely to occur. In other words, it becomes possible to create a light and solid diaphragm capable of obtaining high internal loss, particularly a speaker diaphragm suitable for tweets to be used for high-pitched sounds.

Each step of the production method of the speaker diaphragm may be appropriately omitted in accordance with the structure of the speaker diaphragm to be produced. For example, in the case of a speaker diaphragm consisting of only the highly rigid layer, the above-described laminating step can be omitted.

EXAMPLES

Hereinafter, the present disclosure will be further described in detail by way of Examples, but the present disclosure is not limited to the following Examples.

Types of Fibers

First, to confirm characteristics due to differences in types of the fibers, trial products 1 to 4 were created, and for each, the apparent modulus of elasticity, which is a marker of the rigidity; and a loss tangent, which is a marker of the vibration attenuation rate, were measured.

Trial Product 1

As an Example of the present disclosure, trial product 1 of the speaker diaphragm, having a pair of the highly rigid layers, two semi-rigid layers, and three porous layers, was produced. Each of the pair of the highly rigid layers constituted one of the outermost surfaces of the speaker diaphragm. Three layers of the porous layers were placed to be interposed between the pair of the highly rigid layers, and the semi-rigid layers were each placed in a space between the three layers of the porous layers. In other words, trial product 1 has a seven-layer structure in which the highly rigid layers or the semi-rigid layers are alternately laminated with the porous layers (the highly rigid layers are not directly laminated with the semi-rigid layers); the pair of the outermost surfaces are highly rigid layers; and inside, interposed between the porous layers, two semi-rigid layers are formed. To attain a percentage content of the solid content of 0.3% for materials used to form each of the layers, trial product 1 was formed by hot pressing a laminate of layers that had been formed by subjecting a slurry dispersed in water to sheet-forming.

Highly Rigid Layers

As formation materials for the highly rigid layers (the solid matter in the slurry), polyethylene short fibers to become the resin matrix, wood fibers, and, as the highly rigid fibers, polyparaphenylenebenzobisoxazole (PBO) fibers were mixed to have a mass ratio of 60:25:15 (percentage content of PBO fibers with respect to total fibers (other than dissolved chemical pulp): 37.5% by mass). The highly rigid layers were subjected to sheet-forming to have a basis weight of 68 g/m².

Semi-Rigid Layers

As formation materials for the semi-rigid layers, polyethylene short fibers to become the resin matrix, and wood fibers were mixed to have a mass ratio of 70:30. The semi-rigid layers were subjected to sheet-forming to have a basis weight of 14 g/m².

Porous Layers

As formation materials for the porous layers, polyethylene short fibers to become the resin matrix, wood fibers, and thermally expandable microcapsules for forming the pores were mixed to have a mass ratio of 60:40:50. The porous layers were subjected to sheet-forming to have a basis weight of 76 g/m².

In the formation materials for each of the layers, as the polyethylene short fibers, "E400," available from Mitsui Chemicals, Inc., was used; and as the wood fibers, needle bleached kraft pulp was used. Further, as the highly rigid fibers in the highly rigid layers, "Zylon" chopped fibers (cut length: 3 mm), available from Toyobo Co., Ltd., were used. In addition, as the thermally expandable microcapsules of the porous layers, "Expancel DU," available from Japan Fillite Co., Ltd., was used.

The laminate containing each of the layers was formed by: separately subjecting each of the layers to sheet-forming using a sheet-forming mold; transferring each of the layers in order from the sheet-forming mold onto a drying mold for drying; and dehydrating a resulting laminate on the drying mold under reduced pressure. It is to be noted that as the sheet-forming mold, a metallic mesh formed into a cone mold was used. Further, as the drying mold, an item obtained by spreading felt over a cone-shaped base mold having holes formed therein for dehydration under reduced pressure was used.

The laminate of the layers, in which each of the layers of the formation materials had been subjected to sheet-forming, was dried for 1 hour in an oven at 80° C., and then hot pressed with press molds. Spacer(s) of 1.0 mm was/were placed between the press molds, and heating was conducted at a heating temperature of 140° C. for a heating time period of 15 sec; after the heating, cooling was conducted until a temperature of 45° C. was reached, and then a speaker diaphragm thus formed was removed from the press molds.

Trial Product 2

For comparison with trial product 1, trial product 2 of the speaker diaphragm, having a pair of the highly rigid layers, two semi-rigid layers, and three porous layers, was produced. Trial product 2 was produced similarly to trial product 1 described above, except that, as the formation materials of the highly rigid layers, polyethylene short fibers to become the resin matrix, and wood fibers were mixed to give a mass ratio of 60:40.

Trial Product 3

Further, trial product 3 of the speaker diaphragm, having a pair of the highly rigid layers, two semi-rigid layers, and three porous layers, was produced. Trial product 3 was produced similarly to trial product 1 described above, except that polyparaphenyleneterephthalamide fibers were used in place of the polyparaphenylenebenzobisoxazole fibers as the highly rigid fibers. It is to be noted that as the polyparaphenyleneterephthalamide fibers, "Kevlar" pulp, available from Du Pont-Toray Co., Ltd, was used.

Trial Product 4

Further, trial product 4 of the speaker diaphragm, having a pair of highly rigid layers, two semi-rigid layers, and three porous layers, was produced. Trial product 3 was produced similarly to trial product 1 described above, except that carbon fibers were used in place of the polyparaphenylenebenzobisoxazole fibers as the highly rigid fibers.

Apparent Modulus of Elasticity

The apparent modulus of elasticity was measured for each of trial products 1 to 4. It is to be noted that the apparent moduli of elasticity were measured by using pieces of the speaker diaphragms cut into samples 15 mm in width and 60 mm in length to conduct a three-point bending test (distance between support points: 40 mm) conforming to JIS-K7017 (1999). It is to be noted that as a measuring apparatus, "ARES-G2," available from TA Instruments, was used.

Loss Tangent

Moreover, the loss tangent (tan δ) was measured as a marker of the vibration attenuation rate for each of trial products 1 to 4. It is to be noted that the loss tangents were measured in conformance with JIS-K7244 (1998) using pieces of the speaker diaphragms cut into samples 15 mm in width and 60 mm in length. It is to be noted that as a measuring apparatus, "ARES-G2," available from TA Instruments, was used.

Figure 5:
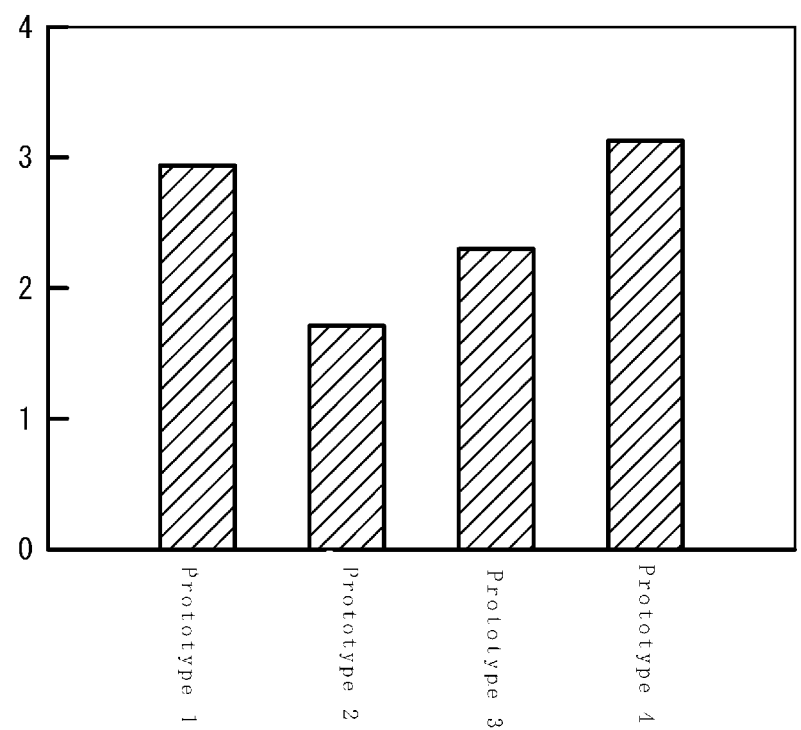
FIG. 5 is a graph illustrating apparent moduli of elasticity of trial products of speaker diaphragms having differing types of fibers.

The measurement results for the apparent moduli of elasticity of trial products 1 to 4 are shown together in FIG. 5, and the measurement results for the loss tangents of trial products 1 to 4 are shown together in FIG. 6.

As shown in the figures, trial product 1, containing the highly rigid fibers, shows high values for both the apparent modulus of elasticity and the loss tangent. In contrast, for trial product 2, in which only the wood fibers were used, both the apparent modulus of elasticity and the loss tangent are low. For trial product 3, containing the polyparaphenyleneterephthalamide fibers, both the apparent modulus of elasticity and the loss tangent are low compared to trial product 1, but indicate improvements over trial product 2. Further, for trial product 4, containing the carbon fibers, the loss tangent is even less than that of trial product 2, but the apparent modulus of elasticity obtained is comparable to that of trial product 1.

As confirmed in the above, the speaker diaphragm in which the highly rigid layers as the outermost layers contain the highly rigid fibers has preferable properties in which both the rigidity and the vibration attenuation rate are high.

Percentage Contents of Resin Matrix and Wood Fibers

Next, in order to verify differences in the rigidity due to differences in the percentage content of the resin matrix, trial products 5 to 15 were produced, and the apparent moduli of elasticity were measured.

Except for having the percentage content of the highly rigid fibers be a fixed 15% by mass; the percentage content of the polyethylene short fibers be, in order, 0% by mass, 5% by mass, 20% by mass, 30% by mass, 40% by mass, 50% by mass, 60% by mass, 65% by mass, 75% by mass, 80% by mass, and 85% by mass; and a remainder be wood fibers, trial products 5 to 15 were produced similarly to trial product 1.

Figure 7:
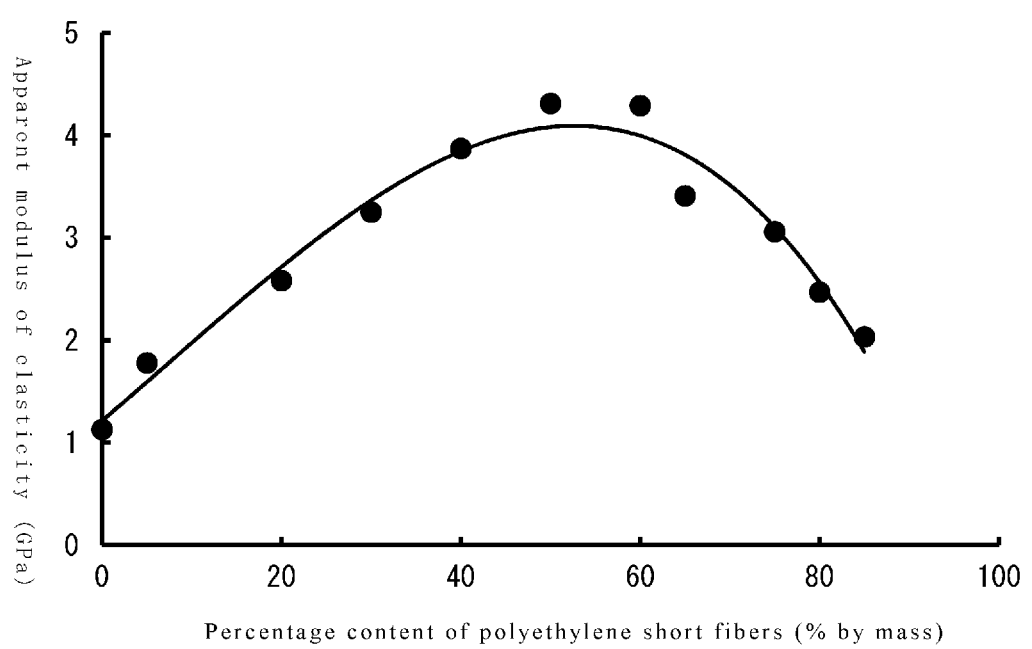
FIG. 7 is a graph illustrating apparent moduli of elasticity of trial products of speaker diaphragms having differing percentage contents of polyethylene short fibers.

The measurement results of the apparent moduli of elasticity of trial products 5 to 15 are shown together in FIG. 7. As shown in the figure, it was confirmed that by setting the percentage content of the resin matrix to be preferably 20% by mass or more and 80% by mass or less, more preferably 40% by mass or more and 70% by mass or less, and still more preferably 50% by mass or more and 60% by mass or less (with a percentage content of the total fibers being 40% or more and 50% or less), it is possible to increase the modulus of elasticity of the speaker diaphragm.

Percentage Content of Highly Rigid Fibers and Wood Fibers

Next, in order to verify differences in the rigidity due to differences in the percentage content of the highly rigid fibers, trial products 16 to 22 were produced, and the apparent moduli of elasticity were measured.

Except for having the percentage content of the polyethylene short fibers be a fixed 60% by mass, within the above-mentioned optimal range; the percentage content of the highly rigid fibers be, in order, 0% by mass, 5% by mass, 10% by mass, 20% by mass, 25% by mass, 35% by mass, and 40% by mass; and the remainder be wood fibers, trial products 16 to 22 were produced similarly to trial product 1.

The measurement results of the apparent moduli of elasticity of trial products 16 to 22 are shown together in FIG. 8. As shown in the figure, it was confirmed that by setting the percentage content of the highly rigid fibers to be 10% by mass or more and 30% by mass or less, it is possible to increase the modulus of elasticity of the speaker diaphragm. In other words, in a case in which a part other than the resin matrix is only the wood fibers or only the highly rigid fibers, the apparent modulus of elasticity becomes lower. Accordingly, obtaining high rigidity is enabled by the wood fibers and the highly rigid fibers being joined together by the resin matrix.

Percentage Content of Highly Rigid Fibers and (Resin Matrix+Wood Fibers)

Further, in order to test an influence on the percentage content of the wood fibers with respect to differences in the rigidity due to differences in the percentage content of the highly rigid fibers, trial products 23 to 27 were produced, and the apparent moduli of elasticity were measured.

Except for having the percentage content of the highly rigid fibers be, in order, 0% by mass, 10% by mass, 15% by mass, 25% by mass, and 40% by mass; and the remainder be such that a ratio of the polyethylene short fibers to the wood fibers was 25:60, trial products 23 to 27 were produced similarly to trial product 1.

The measurement results of the apparent moduli of elasticity of trial products 23 to 27 are shown together in FIG. 9. In FIG. 9, the reduction of the modulus of elasticity in the case of increasing the percentage content of the highly rigid fibers is shown to be inhibited compared to FIG. 8, and an improvement in the modulus of elasticity is apparent in the case of having the percentage content of the highly rigid fibers be 40% with respect to the case of having the percentage content of the highly rigid fibers be 0%.

INDUSTRIAL APPLICABILITY

The speaker diaphragm according to the present disclosure can be particularly suitably used as a diaphragm (vibration plate) to be used in a speaker that may be exposed to water. The foregoing disclosure has been set forth merely to illustrate the embodiments invention and is not intended to be limiting. Since modifications of the disclosed embodiments incorporating the spirit and substance of the invention may occur to persons having ordinary skill in the art, the embodiments of the invention should be construed to include everything within the scope of the appended claims and equivalents thereof

What is claimed is:
1. A speaker diaphragm comprising:
a plurality of highly rigid layers each comprising a first resin matrix, and wood fibers and highly rigid fibers dispersed in the first resin matrix; and
a porous layer comprising a second resin matrix comprising independent pores, and fibers comprising wood fibers and highly rigid fibers dispersed in the second resin matrix, wherein
both outermost layers are the highly rigid layers,
a percentage content of the wood fibers in the highly rigid layers is 10% by mass or more and 65% by mass or less,
a percentage content of the highly rigid fibers in the highly rigid layers is 5% by mass or more and 40% by mass or less,
a percentage content of total fibers in the porous layer is 15% by mass or more and 40% by mass or less, and
the highly rigid fibers in the highly rigid layers, and the highly rigid fiber in the porous layer are identical in type.

2. The speaker diaphragm according to claim 1, wherein an average thickness of the porous layer is 500 μm or less.

3. The speaker diaphragm according to claim 1, wherein a resin of the first resin matrix in the highly rigid layers, and a resin of the second resin matrix in the porous layer are identical in type.

4. The speaker diaphragm according to claim 1, wherein a percentage content of the first resin matrix in the highly rigid layers is 20% by mass or more and 80% by mass or less.

5. The speaker diaphragm according to claim 1, wherein the highly rigid fibers in the highly rigid layers, and the highly rigid fibers in the porous layer each comprise polyparaphenylenebenzobisoxazole fibers, polyparaphenyleneterephthalamide fibers, or carbon fibers.

6. The speaker diaphragm according to claim 1, comprising at least one of the highly rigid layers in addition to the outermost layers, wherein a thickness of the at least one of the highly rigid layers other than the outermost layers is less than a thickness of the highly rigid layers as the outermost layers.

7. The speaker diaphragm according to claim 1, further comprising a semi-rigid layer which is laminated to the porous layer, and in which a content of the highly rigid fibers is less than that in the highly rigid layers.

8. The speaker diaphragm according to claim 1, wherein the resin of the first resin matrix in the highly rigid layers, and the resin of the second resin matrix in the porous layer are each a thermoplastic resin.

9. The speaker diaphragm according to claim 1, wherein an average length of the highly rigid fibers in the highly rigid layers, and an average length of the highly rigid fibers in the porous layer are each 6 mm or less.

10. A production method of a speaker diaphragm comprising:
providing a plurality of highly rigid layers each comprising a first resin matrix, and wood fibers and highly rigid fibers dispersed in the first resin matrix; and providing a porous layer comprising a second resin matrix comprising fibers comprising wood fibers and highly rigid fibers dispersed in the second resin matrix, wherein
- the highly rigid layers are arranged as both of outermost layers,
- a percentage content of the wood fibers the highly rigid layers is 10% by mass or more and 65% by mass or less,
- a percentage content of the highly rigid fibers in the highly rigid layers is 5% by mass or more and 40% by mass or less,
- a percentage content of total fibers in the porous layer is 15% by mass or more and 40% by mass or less, and
- the highly rigid fibers in the highly rigid layers, and the highly rigid fiber in the porous layer are identical in type, subjecting materials for forming the highly rigid layers and the porous layer to wet sheet-forming to form layer shapes;

drying material layers obtained by the wet sheet-forming; and hot pressing the material layers following the drying.

11. A speaker diaphragm comprising:

a plurality of highly rigid layers each comprising a first resin matrix, and wood fibers and highly rigid fibers dispersed in the first resin matrix; and a porous layer comprising a second resin matrix comprising independent pores, and fibers comprising wood fibers and highly rigid fibers dispersed in the second resin matrix, wherein
- both outermost layers are the highly rigid layers,
- a percentage content of the wood fibers in the highly rigid layers is 10% by mass or more and 65% by mass or less,
- a percentage content of the highly rigid fibers in the highly rigid layers is 5% by mass or more and 40% by mass or less,
- a percentage content of total fibers in the porous layer is 15% by mass or more and 40% by mass or less, and
- a percentage content of the first resin matrix in the highly rigid layers is 20% by mass or more and 80% by mass or less.

12. The speaker diaphragm according to claim 11, wherein an average thickness of the porous layer is 500 µm or less.

13. The speaker diaphragm according to claim 11, wherein a resin of the first resin matrix in the highly rigid layers, and a resin of the second resin matrix in the porous layer are identical in type.

14. The speaker diaphragm according to claim 11, wherein the highly rigid fibers in the highly rigid layers, and the highly rigid fibers in the porous layer each comprise polyparaphenylenebenzobisoxazole fibers, polyparaphenyleneterephthalamide fibers, or carbon fibers.

15. The speaker diaphragm according to claim 11, comprising at least one of the highly rigid layers in addition to the outermost layers, wherein a thickness of the at least one of the highly rigid layers other than the outermost layers is less than a thickness of the highly rigid layers as the outermost layers.

16. The speaker diaphragm according to claim 11, further comprising a semi-rigid layer which is laminated to the porous layer, and in which a content of the highly rigid fibers is less than that in the highly rigid layers.

17. The speaker diaphragm according to claim 11, wherein the resin of the first resin matrix in the highly rigid layers, and the resin of the second resin matrix in the porous layer are each a thermoplastic resin.

18. The speaker diaphragm according to claim 11, wherein an average length of the highly rigid fibers in the highly rigid layers, and an average length of the highly rigid fibers in the porous layer are each 6 mm or less.

19. A production method of a speaker diaphragm comprising:

providing a plurality of highly rigid layers each comprising a first resin matrix, and wood fibers and highly rigid fibers dispersed in the first resin matrix; and providing a porous layer comprising a second resin matrix comprising fibers comprising wood fibers and highly rigid fibers dispersed in the second resin matrix, wherein
- the highly rigid layers are arranged as both of outermost layers,
- a percentage content of the wood fibers in the highly rigid layers is 10% by mass or more and 65% by mass or less,
- a percentage content of the highly rigid fibers in the highly rigid layers is 5% by mass or more and 40% by mass or less,
- a percentage content of total fibers in the porous layer is 15% by mass or more and 40% by mass or less, and
- a percentage content of the first resin matrix in the highly rigid layers is 20% by mass or more and 80% by mass or less, subjecting materials for forming the highly rigid layers and the porous layer to wet sheet-forming to form layer shapes;

drying material layers obtained by the wet sheet-forming; and hot pressing the material layers following the drying.

* * * * *